US006978526B1

(12) United States Patent
Lin

(10) Patent No.: US 6,978,526 B1
(45) Date of Patent: Dec. 27, 2005

(54) STRUCTURE OF A RIVET NUT GUN

(76) Inventor: Yu-Ching Lin, P.O. Box 96-405, Taipei 106 (TW)

(*) Notice: Subject to any disclaimer, the term of this patent is extended or adjusted under 35 U.S.C. 154(b) by 0 days.

(21) Appl. No.: 10/926,411

(22) Filed: Aug. 25, 2004

(51) Int. Cl.[7] .......................... B21J 15/22; F16G 15/18
(52) U.S. Cl. ............................... 29/243.525; 72/391.4; 72/243.523; 92/165 R
(58) Field of Search ............................ 72/391.4, 391.6; 29/243.521, 243.523, 243.524, 243.525; 92/165 R, 166

(56) References Cited

U.S. PATENT DOCUMENTS 4,922,805 A * 5/1990 Beswick ...................... 92/166
4,961,372 A * 10/1990 Leonhartsberger ........ 92/165 R
5,072,501 A * 12/1991 Vincenzo ............... 29/243.525
6,276,037 B1 * 8/2001 Solfronk ................ 29/243.525

* cited by examiner

*Primary Examiner*—David Jones
(74) *Attorney, Agent, or Firm*—Troxell Law Office, PLLC

(57) ABSTRACT

A structure of rivet nut gun having a body, a handle and a pressure cylinder. The top of the handle is furnished with a mounting base having a through cylindrical hole. The lower end of the handle is furnished with a base surface for mounting the fastening disk. The body has a connector mounted with a connecting rod to penetrate through the cylindrical hole of the handle. The fastening disk is fastened to one end of the connecting rod by a nut. The fastening disk is connected with two symmetrical screw rods, which penetrate through the piston and the pressure cylinder, and are fastened to the bottom of the pressure cylinder by two nuts respectively so as to have the piston cylinder fastened in place and to prevent the pressure cylinder from deformation during the rivet nut gun operating.

2 Claims, 5 Drawing Sheets

STRUCTURE OF A RIVET NUT GUN

BACKGROUND OF THE INVENTION

1. Field of the Invention

This invention relates to a rivet nut gun, and particularly to a structure of the rivet nut gun.

2. Description of the Prior Art

A conventional rivet nut gun usually comprises a body, a handle mounted under the body, and a pressure cylinder under the handle; the pressure cylinder includes a piston and a piston rod mounted in the cylindrical hole of the handle; through a pipe, a pressure air can flow into the lower space of the pressure cylinder to push the piston to move; then, a liquid in a hydraulic chamber will be pushed to provide a pressure to actuate the rivet nut gun; however, the parts and their assembling in the rivet nut gun are complex; the pressure cylinder is usually made of a pressure-proof metal, and is to be fastened under the handle; otherwise, a deformation would take place between the pressure cylinder and the handle as a result of riveting operation.

SUMMARY OF THE INVENTION

The prime object of the present invention is to provide a rivet nut gun, in which the body, the handle and the pressure cylinder are assembled together by means of a connecting rod and a nut; such a structure can facilitate the assembling and maintenance of the gun. An another object of the present invention is to provide a rivet nut gun, in which the pressure cylinder and the body are assembled together by means of screw rods to cause the piston cylinder in the pressure cylinder and the inner round surface of a lid in the handle to be in close and hermetic contact; by means of such structure, the assembled parts thereof would not be deformed during operation of the gun.

Still another object of the present invention is to provide a rivet nut gun, in which the cylindrical hole in the handle is for mounting a connecting rod; the lid under the handle is mounted with a fastening disk, which is fastened in place with a nut; the body is mounted on the handle; the lower end of the handle is mounted with a pressure cylinder, which is assembled together with the fastening disk by means of the screw rods under the fastening disk; by means of the aforesaid structure, the pressure cylinder would not be deformed during nut-riveting operation.

A further object of the present invention is to provide a rivet nut gun, in which the piston cylinder is made of metal; the inner surface of the piston cylinder is in close contact with the round surface of the piston; the outer surface of the piston cylinder is coated with a plastic film by means of an injection molding machine. The bottom of the pressure cylinder is furnished with two symmetrical cylindrical holes for receiving two screw rods respectively, which are fastened in place with two nuts so as to have the pressure cylinder fastened under the lid of the handle.

A still further object of the present invention is to provide a rivet nut gun, in which the lower part of the body is furnished with a connecting rod having threads on one end thereof; the inside of the connecting rod is furnished with a cylindrical hole and an oil seal; after the connecting rod is inserted into the cylindrical hole of the handle, it is fastened in place with a nut. The cylindrical hole of the connecting rod is used for receiving a piston rod; as soon as the piston in the pressure cylinder is pushed by means of a pressure air, the piston will be moved to provide a nut-riveting operation.

DETAILED DESCRIPTION OF THE PREFERRED EMBODIMENT

Figure 1:
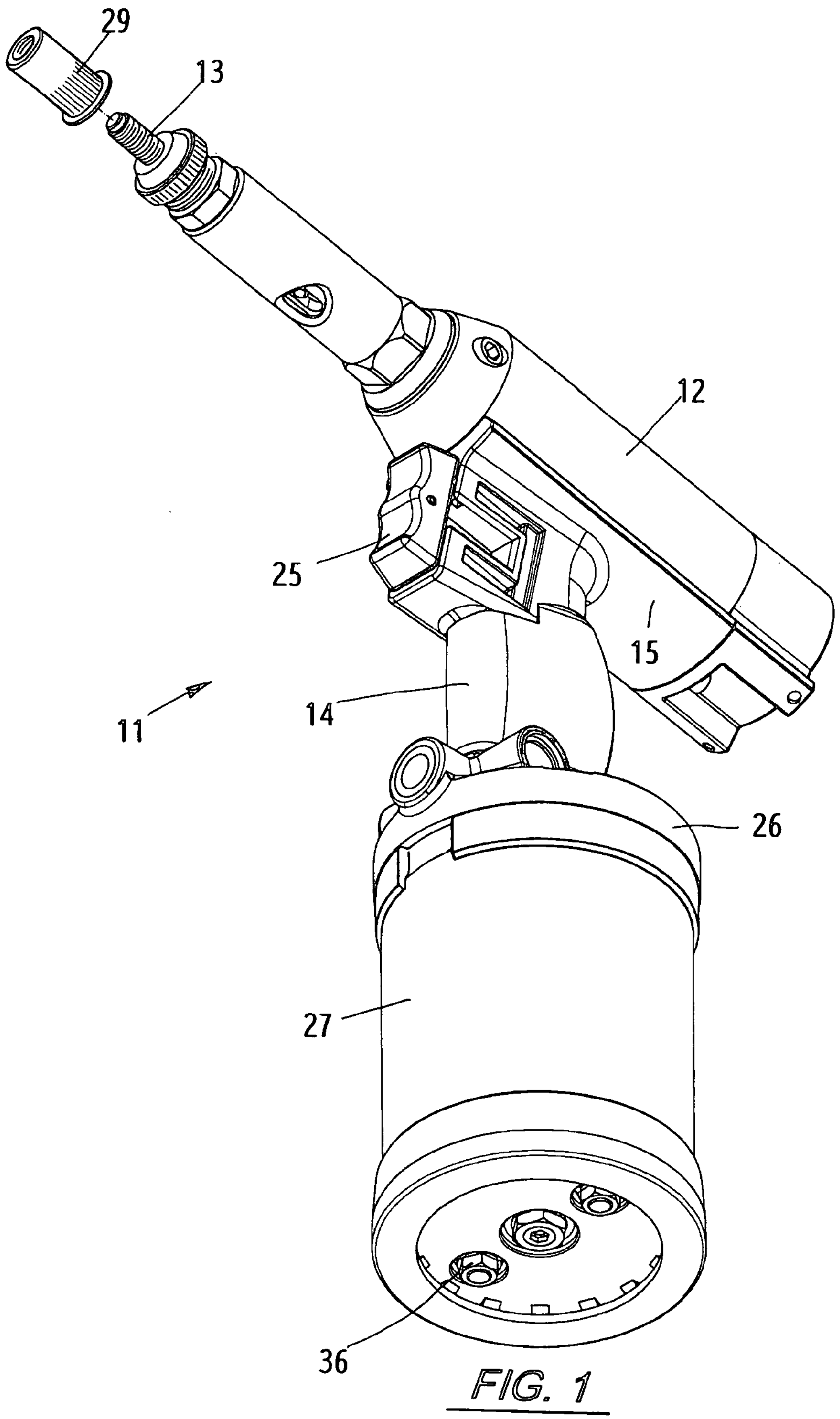
FIG. 1 is a perspective view of the present invention.
Figure 2:
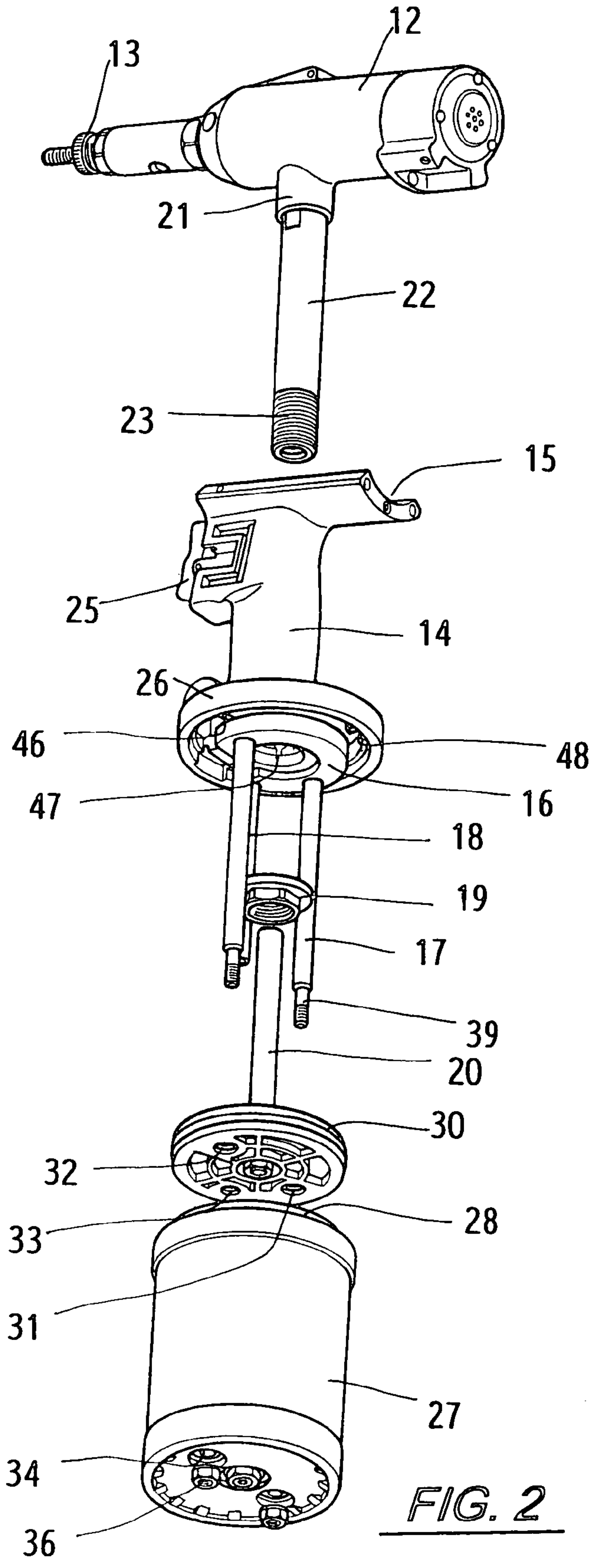
FIG. 2 is a disassembled view of the present invention, showing the assembled view of the present invention, showing the assemblies of the rivet nut gun.
Figure 3:
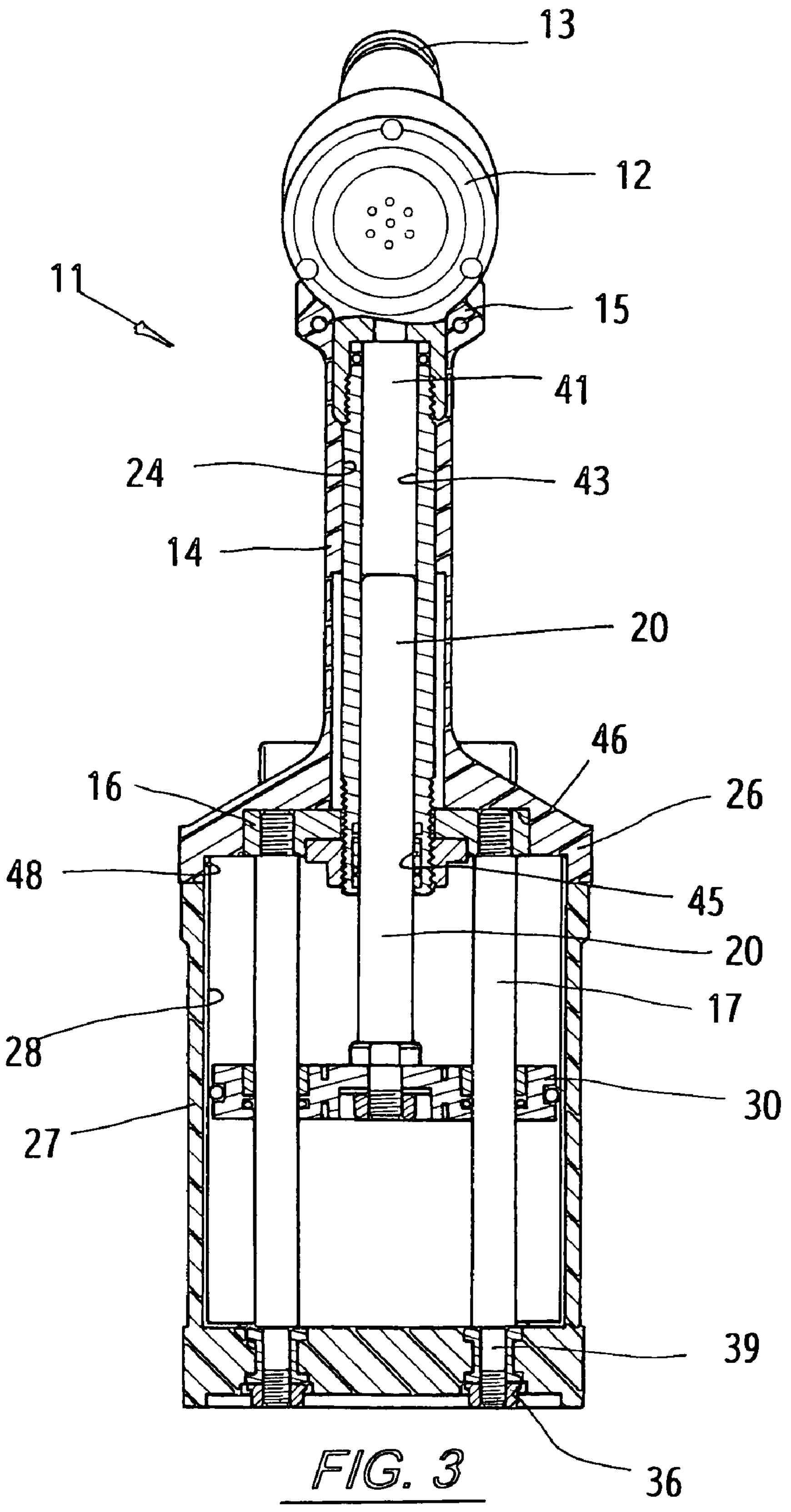
FIG. 3 is a sectional view of the present invention, showing the upper and lower assemblies of the handle.
Figure 4:
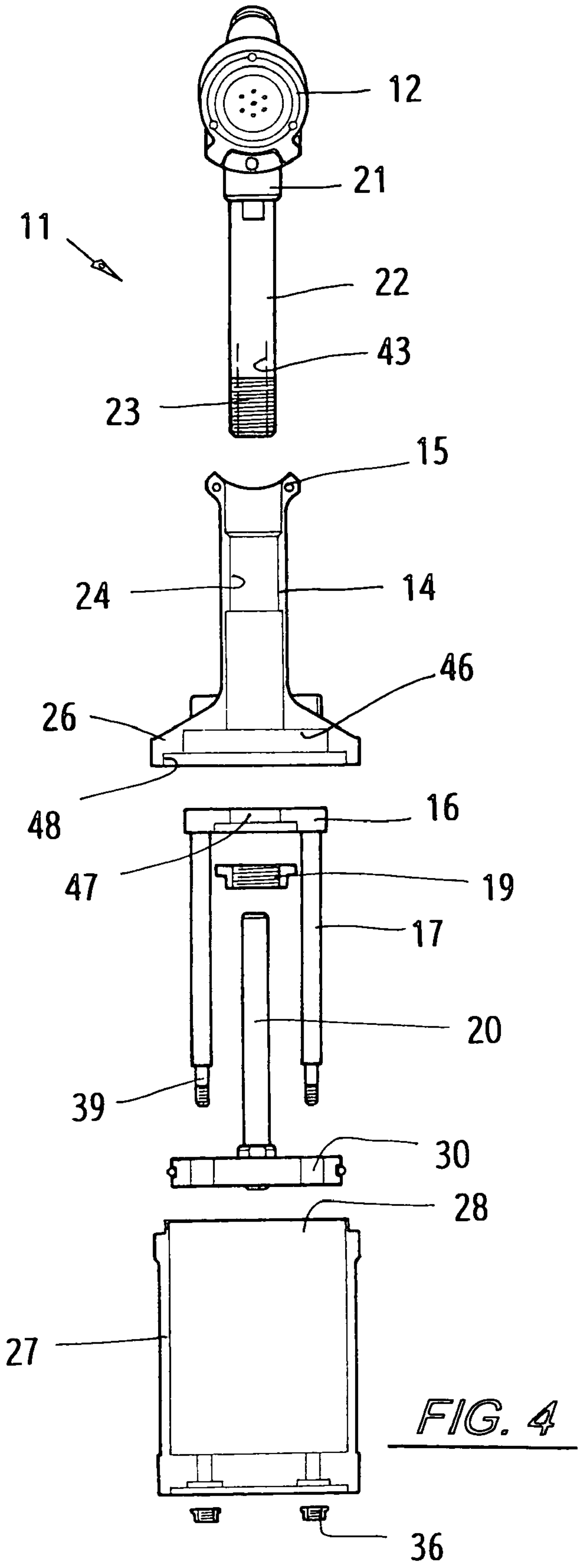
FIG. 4 is another disassembled view of the present invention, showing the assemblies of the rivet nut gun.

This invention relates to structure of a rivet gun; as shown in FIGS. 1, 2 and 4, the center of the handle 14 of rivet nut gun 11 is furnished with a cylindrical hole 24 for mounting a connecting rod 22 therein under the body 12; one end of the connecting rod 22 has threads 23, which extends into an inner surface 46 of a lid 26 under the handle 14; then, a fastening disk 16 with a round bar 17 is mounted in the inner surface 46, and then the cylindrical hole thereof is mounted to the threads 23, and is fastened in place with a nut 19; in that case, the body 12, the handle 14 and the fastening disk 16 are assembled together as one piece. The fastening disk 16 is mounted with round bars 17 to facilitate a pressure cylinder 27 be mounted in the inner surface 46 of the handle 14; after the round bars 17 penetrate through the cylindrical holes 34 in the bottom of the pressure cylinder 27, the round bars are fastened in place with nuts 36 so as to prevent the pressure cylinder 27 from deformation during the rivet nut gun 11 being operated with a pressure air.

The handle 14 of the rivet nut gun 11 has a grip portion, of which one side is furnished with a pressure air control assembly and a trigger 25; the top of the handle has a mounting base 15 for mounting the body 12 thereon firmly. The rear end of the mounting base 15 is furnished with two independent pressure-air pipes, which can provide the related parts in the body with a power for a positive screwing turn and a negative screwing turn. The center of the handle 14 is furnished with a cylindrical hole 24 and a lid 26; the bottom of the lid 26 has an inner surface 46 to facilitate the fastening disk 16 to mount in place with a nut 19; one side of the lid 26 is furnished with a cylindrical hole for mounting an intake pipe 18 therein.

The inside of the body 12 of the rivet nut gun 11 is mounted with a pneumatic motor, and a pull-rivet assembly 13. The lower part of the body 12 has a connector 21 connected together with a connecting rod 22; one end of the connector 21 is furnished with threads 23. The inside of the connecting rod 22 is furnished with a cylindrical hole 43 and an oil seal 45. Upon the body 12 and the handle 14 being assembled, the connecting rod 22 is inserted into the cylindrical hole 24 in the handle 14 until the lower side for the body 12 being in close contact with the mounting base 15 of the handle 14; the connecting rod 22 under the body 12 penetrates the inner surface 46 of the lid 26.

The fastening disk 16 has a cascade hole 47 in the center thereof, and the surface of the fastening disk is furnished with two symmetrical screw holes for mounting two round bars 17, of which the other ends are furnished with two screw rods 39 respectively to be fastened in two cylindrical holes 34 in the bottom of the pressure cylinder 27; when the pressure cylinder 27 is assembled together with the lid 26 of the handle 14, the screw rods 39 will be mounted through the two cylindrical holes 34 respectively.

The threads 23 of the connecting rod 22 is to be mated with a nut 19, of which the center has a thread hole, while the outer surface thereof is formed into a hexagonal shape; the end of the nut 19 is furnished with a disk shaped portion; the nut 19 is to be mounted on the threads 23 of the connecting rod 22 so as to have the body 12 and the handle 14 assembled together as one piece.

After the fastening disk 16 is fastened to the inner surface 46 of the handle 14 by means of the nut 19, the fastening disk 16 is mounted with two symmetrical round bars 17; the length of the screw rods 39 on the round bars is designed to fit in the height of the pressure cylinder 27; as soon as the pressure cylinder 27 is mounted under the lid 26 of the handle 14, the screw rods 39 of the round bars 17 will penetrate through the cylindrical holes 34 of the pressure cylinder 27 so as to have the surface of the piston cylinder 28 in the pressure cylinder 27 and the inner surface 46 of the lid 26 of the handle 14 contacted together closely. After the end of the pressure cylinder 27 is in close contact with the lower surface of the lid 26, the outer surface of the handle 14 and the pressure cylinder 27 is in a flat and smooth surface; in that case, the pressure cylinder 27 and the piston cylinder 28 would not be deformed or loosened upon a pressure air being applied to the piston cylinder 28 in the pressure cylinder 27.

After the connecting rod 22 of the body 12 is inserted through the inner surface 46 of the handle 14, and is fastened in place with a nut 19 the threads 23 of the connecting rod 22 further extends into the piston cylinder 28 of the pressure cylinder 27; a piston 30 on the piston rod 20 is mounted in the piston cylinder 28 in the pressure cylinder 27. The inside of the piston cylinder 28 is mounted with round bars 17 and an intake pipe 18. The piston cylinder 30 is furnished with corresponding cylindrical holes 31 and 33 for receiving the round bars 17 and the intake pipe 18; each cylindrical hole is mounted with an oil seal; one end of the piston rod 20 in the center of the piston 30 is inserted into the cylindrical hole 43 of the connecting rod 22; then, the oil seal 45 in the cylindrical hole 43 and the piston rod 20 will be in close contact so as to prevent oil from leaking out.

The cylindrical holes 31 and 32 in the piston 30 are used for receiving the round bars 17 and the intake pipe 18. When the piston 30 is pushed to move, the center of the piston rod 20 will move along the round bars 17 and the intake pipe 18; the surface of the round bars 17 and the intake pipe 18 will have a tiny eccentric move by means of the seal rings without affecting the displace guide effect of the piston 30.

The pressure cylinder 27 under the handle 14 includes a pressure cylinder 27 and a piston cylinder 28; the piston cylinder 28 is mounted in the pressure cylinder 27, and the piston cylinder 28 is made of metal; a piston 30 is mounted in the piston cylinder; the surface of the piston 30 is in close contact with the piston cylinder. The outer surface of the piston cylinder 28 is covered with a plastic cylinder; the pressure cylinder 27 and the piston cylinder 28 are an inseparable assembly. The bottom of the pressure cylinder 27 is furnished with symmetrical cylindrical holes and a pressure-bleeding hole.

After the pressure cylinder 27 is mounted under the lid 26 of the handle 14, the piston rod 20 and the piston 30 must be mounted first in the cylindrical hole 43 of the handle 14; the inner surface of the piston cylinder 28 and the outer surface of the piston 30 are in close contact upon the piston being put in the piston cylinder 28; then, the two round bars 17 under the lid 26 will be put into the cylindrical holes 34 in the bottom of the pressure cylinder 27; finally, the end of the piston cylinder 28 is guided into the inner round surface 48 of the lid 26, and then piston cylinder 28 and the lid 26 will be in close contact; the two symmetrical round bars 17 in the bottom of the pressure cylinder 27 will be fastened in place with two nuts 36 and two screw rods 39 respectively; in that case, the pressure cylinder 27 is fastened to the lid 26 of the handle 14, and the pressure cylinder 27 and the lid 26 are connected together as one piece.

Generally, the main assemblies of the present invention must be assembled first; in that case, the fastening disk 16 and the round bars 17 should be assembled together in the inner surface 46 of the lid 26 first; then, the connecting rod 22 under the cylindrical hole 24 of the handle 14, and the threads 23 of the connecting rod 22 are fastened in place with a nut 19 so as to have the body 12 and the handle 14 fastened together as one piece; the piston rod 20 is inserted into the cylindrical hole 43 of the connecting rod 22, and then the pressure cylinder 27 is assembled to the lid 26 of the handle 14; finally, two symmetrical nuts 36 as mounted to the round bars so as to have the rivet nut gun 11 assembled; such a assembling procedure is deemed a convenient way for assembling or disassembling the same.

Figure 5:
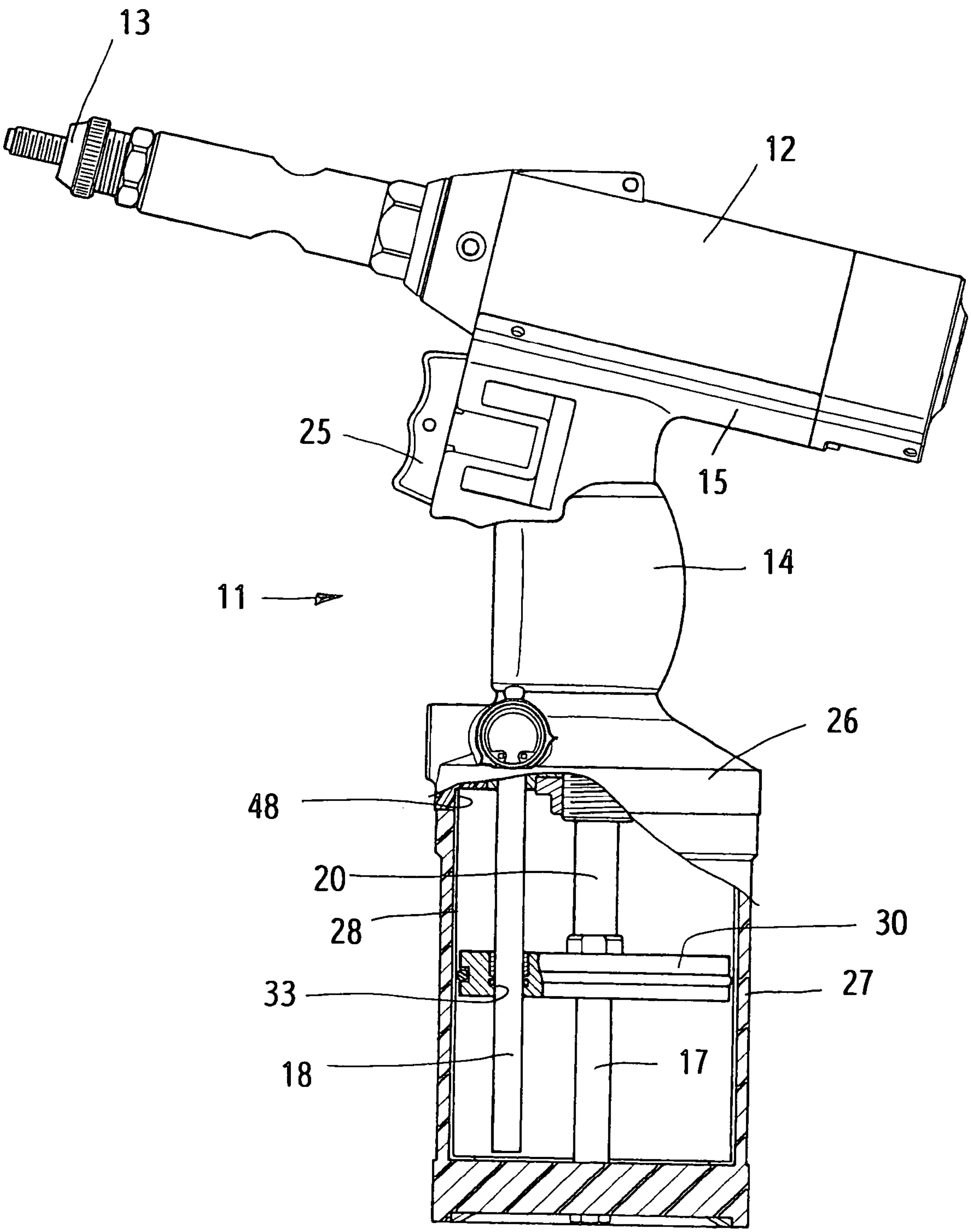
FIG. 5 is a sectional view of the present invention, showing the structure of the rivet nut gun.

To operate the rivet nut gun 11 as shown in FIG. 5, press the trigger 25 first to have the pressure air flowed through the intake pipe 18 and into the lower space of the piston cylinder 28 so as to push the piston 30 to move upwards; then, the piston rod 20 of the piston 30 in the cylindrical hole 43 of the connecting rod 22 will push liquid in the hydraulic chamber 41; as soon as the liquid in the hydraulic chamber 41 is pushed, a power will be transmitted to the rivet assembly 13 of the body 11 to provide rivet operation.

As soon as a pressure air flows through the intake pipe 18 and enters the lower portion of the piston cylinder 28 under the piston 30, a given pressure will be applied to the surface of the piston cylinder 28; since the piston cylinder 28 is made of metal, and is connected closely with the pressure cylinder, which is connected firmly with the handle 14 by means of the symmetrical round bars 14 and two nuts 36, the connection strength between the handle 14 and the piston cylinder 28 would not be affected during riveting operation.

While the invention has been described with reference to specific embodiments it must be understood that those embodiments are susceptible to many changes, substitutions, and modifications that will be readily apparent to those having ordinary skill in the art without departing from the scope and spirit of the invention.

What is claimed is:

1. A rivet nut gun comprising:

a) a body (12) having:
  i) a rivet assembly (13) located on a front end thereof;
  ii) a plurality of actuating assemblies located on an interior thereof;
  iii) a connector (21) located on a bottom thereof; and
  iv) a connecting rod (22) threadedly connected at a first rod end to the connector and having a cylindrical through hole (43);
b) a fastening disc (16);
c) a handle (14) having:
  i) a hollow interior (24), the connecting rod is inserted through the hollow interior of the hollow handle;
  ii) a mounting base (15) located on a top thereof and engaging the bottom of the body; and
  iii) a lid (26) located on a bottom thereof and having an inner surface (46) and a round surface (48), the fastening disc engaging the inner surface and being connected to the handle by a nut threadedly connected to a second rod end of the connecting rod, the nut having a through hole, the fastening disc includes two round bars protruding downwardly from a bottom thereof; and d) a piston cylinder (28) having an end inserted into the round surface of the lid and two piston cylinder holes through which the two round bars are inserted, the piston cylinder is connected to the lid by two nuts threadedly connected to the two round bars.

2. A rivet nut gun comprising:

a) a body (12) having:

i) a rivet assembly (13) located on a front end thereof;

ii) a plurality of actuating assemblies located on an interior thereof;

iii) a connector (21) located on a bottom thereof; and iv) a connecting rod (22) threadedly connected at a first rod end to the connector and having a cylindrical through hole (43);

b) a fastening disc (16) having a cascade hole (47);

c) a handle (14) having:

i) a hollow interior (24), the connecting rod is inserted through the hollow interior of the hollow handle;

ii) a mounting base (15) located on a top thereof and engaging the bottom of the body; and iii) a lid (26) located on a bottom thereof and having an inner surface (46) and a round surface (48), the fastening disc engaging the inner surface and being connected to the handle by a nut located on a bottom thereof and threadedly connected to a second rod end of the connecting rod, the fastening disc includes two round bars protruding downwardly from a bottom thereof;

d) a pressure cylinder (27) having a metal piston cylinder (28) having an end inserted into the round surface of the lid and two piston cylinder holes through which the two round bars are inserted, the piston cylinder is connected to the lid by two nuts threadedly connected to the two round bars; and e) a piston (30) inserted into the piston cylinder and having a piston rod (20) in a center thereof, the piston rod is inserted through the cascade hole and into the cylindrical through hole of the connecting rod, the piston includes two symmetrical cylindrical holes, each of the two symmetrical cylindrical holes having a seal ring, the fastening disc including the two round bars having a first rod end connected to the fastening disc and a second rod end connected to the pressure cylinder; one of the two round bars in inserted through each of the two symmetrical cylindrical holes.

* * * * *